(12) United States Patent
Finlayson et al.

(10) Patent No.: US 9,001,121 B2
(45) Date of Patent: Apr. 7, 2015

(54) METHOD AND APPARATUS FOR GENERATING DATA FOR THREE-DIMENSIONAL MODELS FROM X-RAYS

(75) Inventors: John William Finlayson, Renton, WA (US); Kirk Douglas Skaggs, Federal Way, WA (US); William Talion Edwards, Foristell, MO (US); David M. Siebenaler, Federal Way, WA (US); Douglas David Gaj, Renton, WA (US); Timothy John Suhr, Algona, WA (US); Justin Thomas, Everett, WA (US); Billy Punlap Tung, Seattle, WA (US); Kava Sirvan Crosson-Elturan, Seattle, WA (US); Thomas Harland Bluhm, Auburn, WA (US); Morteza Safai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 2273 days.

(21) Appl. No.: 11/940,699

(22) Filed: Nov. 15, 2007

(65) Prior Publication Data

US 2009/0128557 A1    May 21, 2009

(51) Int. Cl.
*G06T 17/00* (2006.01)
*G01S 5/16* (2006.01)

(52) U.S. Cl.
CPC ............... *G06T 17/00* (2013.01); *G01S 5/166* (2013.01); *G06T 2200/08* (2013.01)

(58) Field of Classification Search
CPC ......... G06T 17/20; G06T 19/00; G06T 15/08; G06T 17/10; G06T 17/00; G06T 2200/04
USPC ................................... 345/420, 419, 424, 441
See application file for complete search history.

(56) References Cited

U.S. PATENT DOCUMENTS 7,224,772 B2    5/2007    Jacobs et al.

OTHER PUBLICATIONS

A. Crews et al., X-Ray Computed Tomography for Geometry Acquisition; Materials Directorate Wright Laboratory Air Force Material Command; Mar. 1993.*
Shum et al., Cost-Effective Solid Reconstruction from X-Ray Image; Journal of Materials Processing Technaology 121; Elsevier (2002, month unknown).*

(Continued)

*Primary Examiner* — Carlos Perromat
(74) *Attorney, Agent, or Firm* — Yee & Associates, P.C.

(57) ABSTRACT

A computer implemented method, apparatus, and computer usable program code for generating a three-dimensional model of an object of interest in an aircraft. In response to transmitting a plurality of x-rays from a set of transmission points into the aircraft, backscatter x-ray data is received. The object identified from a two-dimensional diagram of the backscatter data. Points for the object are created from the identification of the object in the received data. The points are placed at a first distance from the transmission points to form a first curve. The points are placed at a second distance from the transmission points to form a second curve. A first surface is formed from the first and second curves. A second surface is formed that intersects the first surface to form an intersection. Three-dimensional data is generated for the three-dimensional model of the object from the intersection.

24 Claims, 12 Drawing Sheets

(56) References Cited

OTHER PUBLICATIONS

Merriam Webster Dictionary Online; definition for backscatter; http://www.merriam-webster.com/dictionary/backscatter; retrieved Feb. 9, 2011.*

Shedlock et al., "Optimization of a RSD X-Ray Backscatter System for Detecting Defects in the Space Shuttle External Tank Thermal Foam Insulation", Penetrating Radiation Systems and Applications VII, Edited by Doty, F. Patrick; Barber, H. Bradford; Roehrig, Hans., Proceedings of the SPIE, vol. 5923, 2005, pp. 205-216.

* cited by examiner

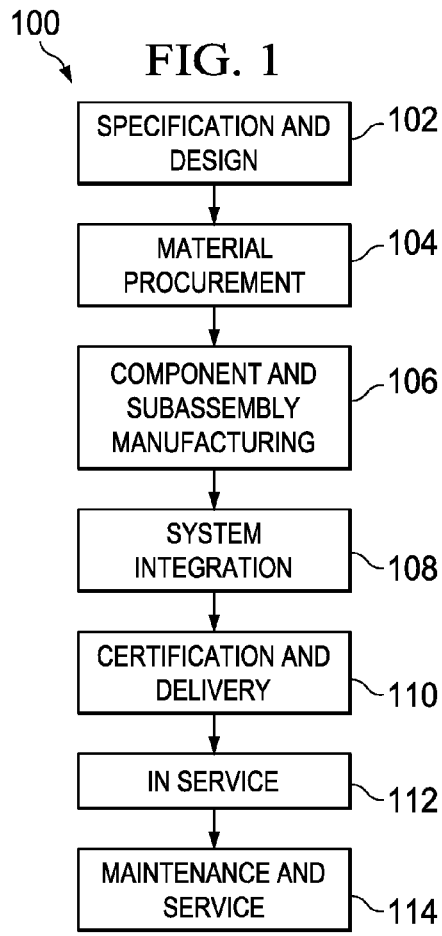
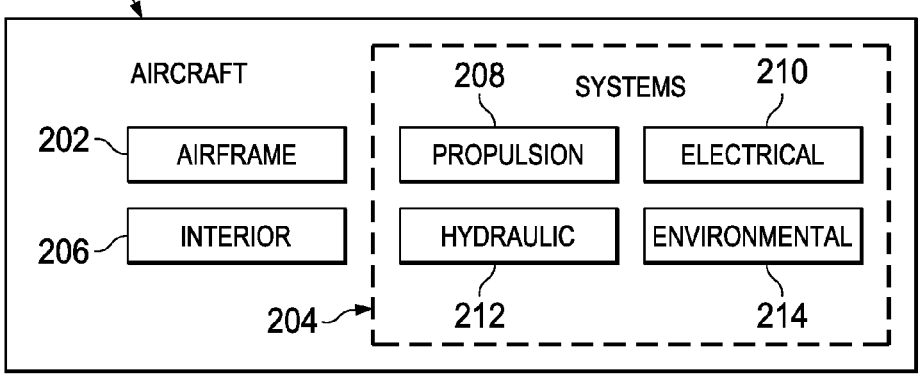

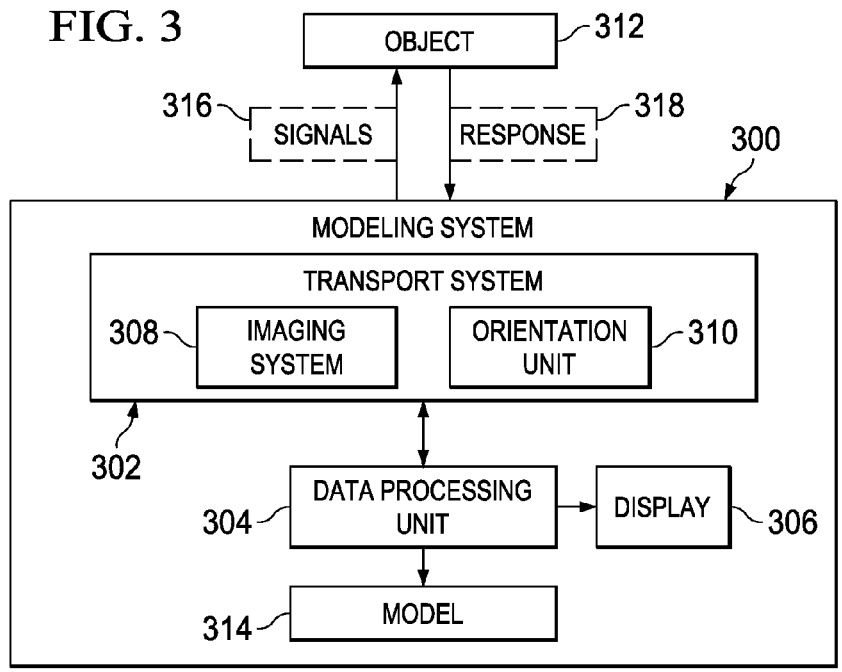
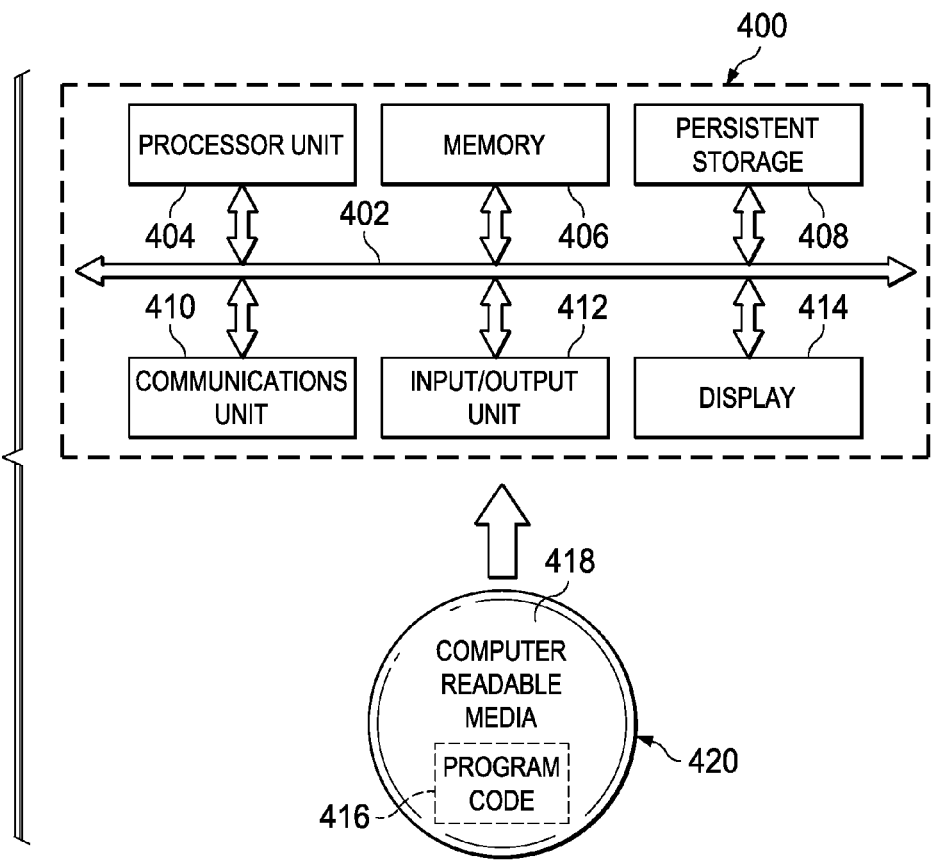

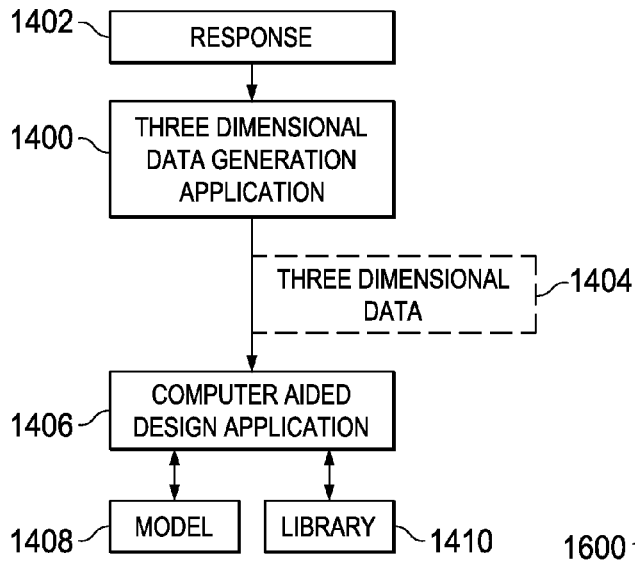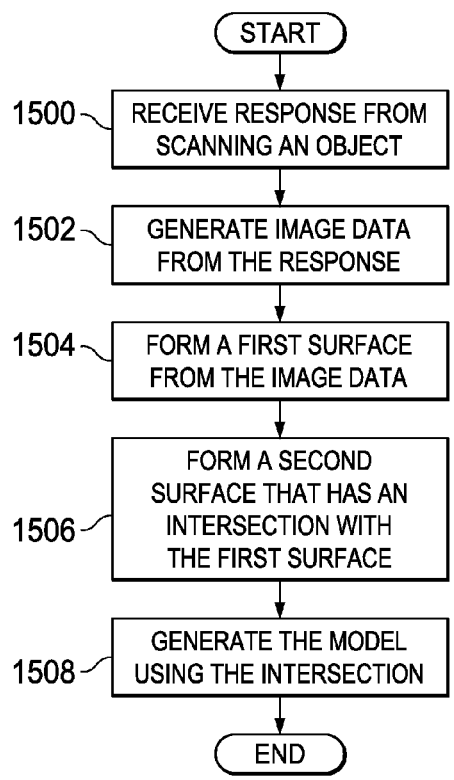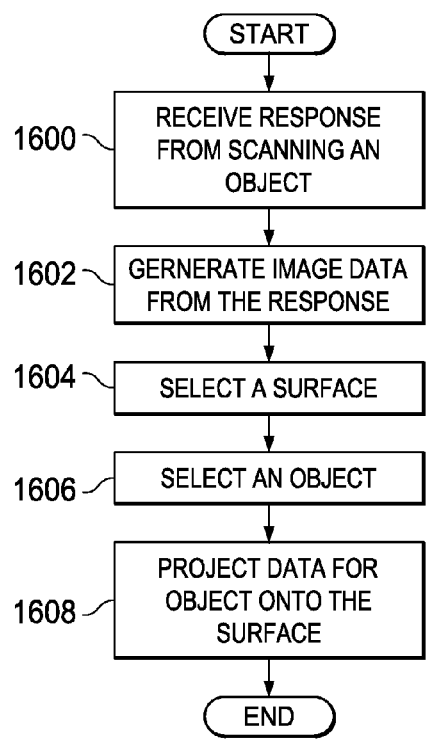

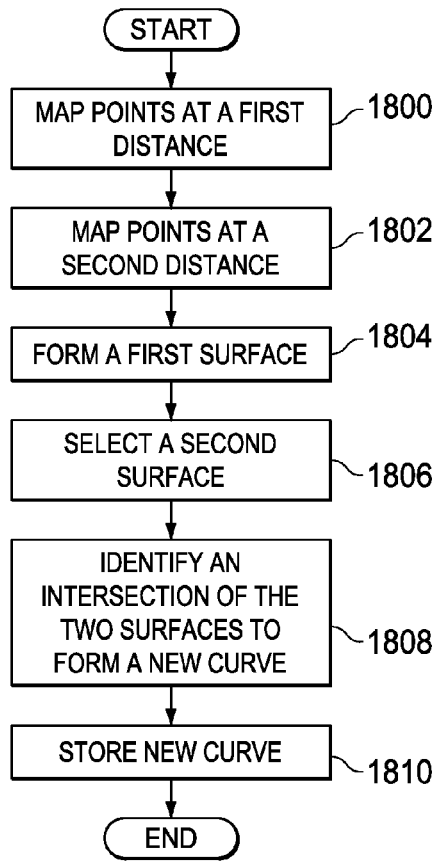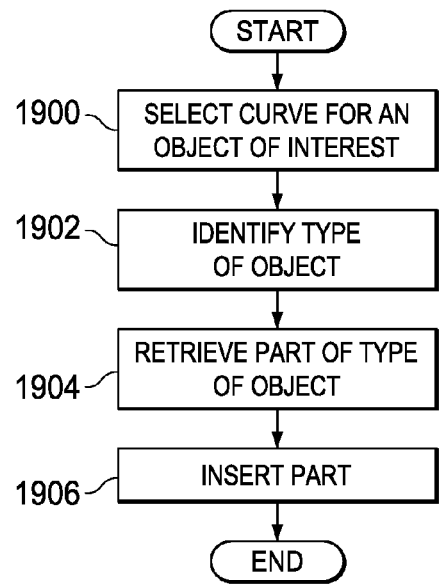

METHOD AND APPARATUS FOR GENERATING DATA FOR THREE-DIMENSIONAL MODELS FROM X-RAYS

BACKGROUND INFORMATION

1. Field

The present disclosure relates generally to an improved data processing system and in particular to a method and apparatus for generating data for three-dimensional models. Still more particularly, the present invention relates to a method, apparatus, and computer usable program code for generating data for three-dimensional models from x-ray data.

2. Background

Imaging and scanning systems have been used in a variety of manufacturing and engineering uses, including reverse engineering. For example, in reverse engineering, an object or structure, such as a vehicle, building, or complex system, may be imaged. A vehicle may include, for example, an aircraft, an automobile, a ship, a submarine, or a spacecraft. A building or complex system may include, an office building or a power plant. These images may be processed to provide two-dimensional drawings or three-dimensional models to replace and/or supplement drawings or models that may not exist or may not be accessible. In many cases, existing models may no longer be accurate due to undocumented modifications to the structure or object.

For example, with military and commercial aircraft, challenges faced by many modification designers or engineers is the uncertainty of the geometric configuration of a given structure and/or system, such as an aircraft. Often times, the legacy drawings, planning information, and tooling information are insufficient to determine the actual configuration of the product. As a result, significant costs for redesign of new systems being placed in the aircraft may be present.

As a specific example, the fuselage of some aircraft may have an outer shell or surface and a liner located inside the fuselage. A space is present between the liner and the shell forming the outer surface. The liner may be made of fiberglass or may be other types of materials in a panel form. The space between the liner and the shell may include insulation, wiring, tubes, pipes, and electrical devices.

When modifications are to be made to these types of aircraft, knowledge of the layout of different objects or components between the liner and the outer shell is desirable. For example, if a new electronic device is to be added to an aircraft between the liner and the shell, it is useful to know where other devices and components are located in order to place the new electronic device. Further, if the location for the new electronic device is to be placed where existing components are located, those existing components may need to be moved.

Currently, in making changes to existing aircraft, the location and identification of different components are identified through drawings and three-dimensional computer aided design models. With some older aircraft, three-dimensional computer aided design models of the aircraft are not available. Only two-dimensional paper drawings may be available. Further, even when three-dimensional models are available, modifications may have been made in which documentation is not present or available. In other words, the available three-dimensional computer aided design model may not accurately reflect objects located in the space between the shell and the liner.

Often times, the owner of the aircraft may not permit disassembly for purposes of planning modifications. Disassembly of the aircraft prior to making the modifications means that the aircraft will be out of commission and unusable for some additional period of time.

As a result, once modifications begin, changes to a plan for modifications may occur. For example, if components are discovered during the actual modification of the aircraft in the location where a new device or system is to be placed, the existing components may have to be moved or the new device or system may have to be placed in a new location. These types of unexpected incidents results in increased time and money for performing modifications to aircraft.

SUMMARY

The advantageous embodiments of the present invention provide a computer implemented method, apparatus, and computer usable program code for generating a three-dimensional model of an object of interest in an aircraft. In response to transmitting a plurality of x-rays from a set of transmission points into the aircraft, backscatter x-ray data is received to form received data. The object of interest is identified from a two-dimensional diagram of the backscatter data to form an identification. A plurality of points for the object of interest is created in the aircraft from the identification in the received data. The plurality of points is placed at a first distance from the set of transmission points to form a first curve. The plurality of points is placed at a second distance from the set of transmission points to form a second curve. A first surface is formed from the first curve and the second curve. A second surface is formed that intersects the first surface to form an intersection. Three-dimensional data is generated for the three-dimensional model of the object of interest in the aircraft from the intersection.

In another advantageous embodiment, a response is received from scanning an object. Image data is generated from the response. A first surface is formed from the image data. A second surface is formed that has an intersection with the first surface, wherein the intersection forms three-dimensional data. The model is generated using the intersection.

In yet another advantageous embodiment, an apparatus comprises an imaging system capable of transmitting signals into an object and receiving a response to the signals. A data processing unit is present, capable of generating image data from the response; forming a first surface is formed from the image data; forming a second surface is formed that has an intersection with the first surface, wherein the intersection forms three-dimensional data; and generating a model using the three-dimensional data.

In another advantageous embodiment, a computer program product contains a computer readable medium having program code to generate three-dimensional data for a three-dimensional model. The program code stored on the computer readable medium receives a response from scanning an object. The program code, during execution, generates image data from the response. Executing the program code forms a first surface from the image data. The program code forms a second surface that has an intersection with the first surface during execution of the program code, wherein the intersection forms the three-dimensional data. When executed, the program code generates the model using the three-dimensional data.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

FIG. 1 is a diagram illustrating an aircraft manufacturing and service method in which an advantageous embodiment may be implemented;

FIG. 2 is a diagram of an aircraft in accordance with an advantageous embodiment;

FIG. 3 is a diagram illustrating components used in generating data for three-dimensional models in accordance with an advantageous embodiment;

FIG. 4 is a diagram of a data processing system in accordance with an illustrative embodiment;

FIG. 14 is a diagram illustrating components used to generate and process three-dimensional computer aided design data from beams used to scan an object in accordance with an advantageous embodiment;

FIG. 15 is a flowchart of a process for generating data for a three-dimensional model in accordance with an advantageous embodiment;

FIG. 16 is a flowchart of a process for generating a three dimensional model in accordance with an advantageous embodiment;

FIG. 18 is a flowchart of a process for generating three-dimensional data for an object of interest in accordance with an advantageous embodiment; and FIG. 19 is a flowchart of a process for creating a three-dimensional model from three-dimensional data in accordance with an advantageous embodiment.

DETAILED DESCRIPTION

Figure 5:
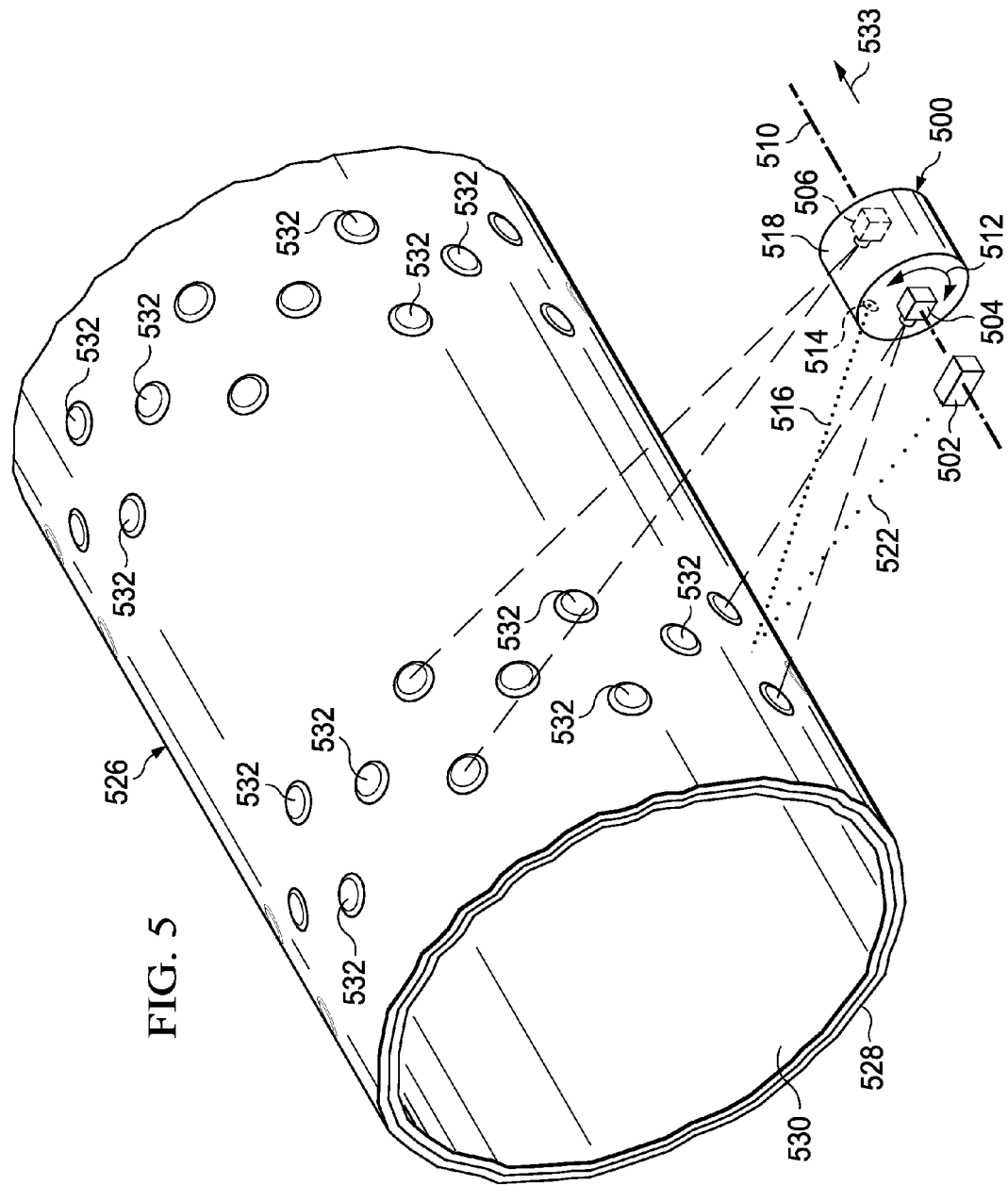
FIG. 5 is a diagram illustrating components within an imaging system and an orientation unit in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, by substantially expediting the assembly of or reducing the cost of aircraft 200. Similarly, one or more of apparatus embodiments, method embodiments, or a combination thereof may be utilized while aircraft 200 is in service 112, for example and without limitation, to maintenance and service 114 in FIG. 1.

Specifically, the different advantageous embodiments may be applied to modifications to existing aircraft made bearing maintenance and service 114 in FIG. 1. Of course, the different advantageous embodiments may be applied to creating models or drawings of aircraft at any stage. For example, the different advantageous embodiments may be applied to generating models of the aircraft during other phases, such as, for example, without limitation, certification and delivery 110 and in service 112 in FIG. 1.

The different advantageous embodiments provide a computer implemented method, apparatus, and computer usable program code for generating data for three-dimensional models. A three-dimensional model includes a three-dimensional drawing of a set of objects. The set of object may be one or more objects. Also, the three-dimensional model may include information about the set of objects. Materials, part numbers, and dimensions are examples of additional information that may be preset in the three-dimensional model. A response is received from scanning an object and image data is generated using the response.

The response includes information needed to generate images that may be analyzed to identify or extract the presence of a set of objects of interest. This extracted data may then be used to define primitives, such as points and/and curves, used to generate the three-dimensional geometry for the three-dimensional model. A first surface is formed from the image data. A second surface is formed that has an intersection with the first surface. A model is then generated using the intersection. In these examples, the data obtained from the intersection forms the data used to generate the model. The scanning may be made in a number of different ways as described in more detail below.

An example of creating three-dimensional data for a model of an object is creating three-dimensional data of an aircraft or a portion of an aircraft by receiving backscatter x-ray data in response to transmitting x-rays from a set of transmission points into to the aircraft.

The backscatter x-ray data may be used to generate images for analysis in identifying a presence of a set of objects of interest. The identification of the objects may be used to identify data to define a set of primitives, such as points and/or curves, for a three-dimensional model. A set of primitives has one or more primitives, in these examples. Three-dimensional data is any data that include information about an object in a three-dimensional space that may be used to create a three-dimensional model. Points are created at a first distance from the set of transmission points to form a first curve. Points are placed at a second distance from the set of transmission points to form a second curve. A surface is formed from the first curve and the second curve. A second surface is then formed that intersects the first surface.

Three-dimensional data is generated for the object of interest in the aircraft from the intersection. In this example, the three-dimensional data include the points at the intersection and the location of the points in a three-dimensional space. The three-dimensional data also may include primitives representing the points in the three-dimensional space. This process may be repeated for different objects in the aircraft with the data being used to create a three-dimensional model of the aircraft. With the data and the model, different activities, such as maintenance, modifications, and upgrades, may be performed on the aircraft.

With reference next to FIG. 3, a diagram illustrating components used in generating data for three-dimensional models is depicted in accordance with an advantageous embodiment. The data generated, in these examples, is three-dimensional data. Three-dimensional data is data that may be used to generate a three-dimensional representation or model or an object of interest. This data may include points or primitives, as well as position or location of the points or primitives in a three-dimensional space.

In this example, modeling system 300 includes transport system 302, data processing unit 304 and display unit 306. Transport system 302 contains imaging system 308 and orientation unit 310. Modeling system 300 may be used to generate three-dimensional geometric data, such as three-dimensional computer aided design data used in three-dimensional models, for an object, such as object 312.

In these examples, object 312 may take various forms, depending on the implementation. Object 312 may be, for example, an aircraft, a helicopter, a ship, a submarine, a spacecraft, a power plant, a building, or a train. As another example, object 312 also may be a subcomponent of a larger structure or system. In other words, object 312 may contain other objects. Object 312 also may be, for example, a hydraulic system, a portion of a fuselage, or a wiring system. Further, object 312 also may be a hidden object that cannot be seen from a visual inspection.

Data processing unit 304 may exchange information with transport system 302. For example, data processing unit 304 may send commands or instructions to transport system 302 to collect data. Further, the information exchanged may include collected data being sent by transport system 302 to data processing unit 304.

In these advantageous embodiments, modeling system 300 may be used to generate a model, such as model 314, from object 318. In the different advantageous embodiments, model 314 may be a two-dimensional drawing or a three-dimensional model of object 312. In these particular examples, model 314 is a three-dimensional computer aided design geometry or model of object 312.

Modeling system 300 operates by transmitting signals 316 into or at object 312 and receiving response 318. Signals 316 may include signals generated by both imaging system 308 and orientation unit 310. Imaging system 308 transmits signals within signals 316 that are used to generate data for creating an image of object 312. Orientation unit 310 transmits signals within signals 316 to obtain data for forming an image from response 318 to signals generated by imaging system 308 within signals 316.

Imaging system 308 may take various forms. In the depicted examples, imaging system 308 may be a backscatter x-ray unit or system that transmits x-rays as part of signals 316. When in the form of a backscatter x-ray unit, imaging system 308 transmits x-ray beams as part of signals 316 into object 312. X-ray photons that are scattered from components or parts within object 312 results in response 318. The data in response 318 may include shadow-like images similar to medical x-rays. This data, in response 318, may be used to generate a two-dimensional image in which identifications of objects may be made. These identifications of one or more objects may then be used to define three-dimensional models as described below.

In these examples, the level or intensity of the x-rays in signals 316 may vary, depending on the particular implementation. For example, if imaging system 308 is placed within a fuselage containing a liner, the level or energy of x-rays may be set to a lower level as compared to placing imaging system 308 on the exterior of the fuselage to gather data.

Further, imaging system 308 may generate different types of images, depending on the implementation. For example, imaging system 308 may be moved along an axis while an emitter rotates at an angle, with respect to the axis, while imaging system 308 moves along the axis to generate signals 316. This type of imaging system generates x-ray beams that form a cylindrical pattern of data.

In another of embodiment, a signal x-ray beam may be transmitted or projected such that the sequence of x-ray beams is always parallel to each other. This type of transmission results in an image being detected in response 318 that is equivalent to an orthographic projection in a two-dimensional drawing.

In some advantageous embodiments, a first x-ray beam and a second x-ray beam may be transmitted in a cylindrical pattern in which the second x-ray beam is transmitted at an angle offset from the first x-ray beam. This type of transmission is also referred to as an off angled dual beam scan. In yet other embodiments, imaging system 308 may transmit signals 316 from a single point in which the emitter or x-ray source of imaging system 308 rotates around two axes to form a spherical pattern of signals 316. In this type of embodiment, imaging system 308 may be moved to another point and transmit an x-ray beam on the spherical pattern at the second point. This type of scan of an object is referred to as a two point spherical scan.

In these types of embodiments, with the off angled dual beam scan and the two point spherical scan, two sets of data are obtained from different perspectives. In other words, for each point in the image, two data points are received in the response for that point in the object. Of course, additional perspectives may be obtained, depending on the particular implementation. For example, three beams may be transmitted at three different angles or the spherical pattern of signals may be transmitted from three different points.

Imaging system 308, however, is not limited to a backscatter x-ray system. Imaging system 308 may be any system that produces response 318 in a form that can be used to generate model 314 using the different advantageous embodiments. For example, imaging system 308 may be, for example, a raster-based line-by-line imaging system. These types systems include, for example, a terahertz beam imaging, microwave imaging, infrared imaging, amplitude modulation radio frequency imaging, and other types of imaging systems.

Additionally, orientation unit 310 also may transmit signals within signals 316. Orientation unit 310 is used to identify the orientation of imaging system 308 for use in producing three-dimensional data. Orientation unit 310 may identify the orientation of imaging system 308 through the use of reference points that may be placed on object 312. These reference points are also referred to as fiducials. These reference points may take various forms. For example, a reference point may be an active infrared emitter or photo reflected decals. Any object or device that may be detected by orientation unit 310 may be used.

Orientation unit 310 may be implemented using different system or technologies, such as a videogrammetry system, or a photogrammetry system. Examples of these systems are a white light scanning system, such as Atos™ series of white light triangulation digitizers. This type of equipment is available from GOM gmbH in Braunsehweig, Germany. Another example is a laser scanner, such as HandyScan 3D™ scanner, which is available from Creaform, Inc. in Levis, Quebec, Canada.

Transport system 302 carries and moves imaging system 308 and orientation unit 310, with respect to object 312, to transmit signals 316 and receive response 318. Transport system 302 may take various forms, depending on the particular embodiment. For example, transport system 302 may be a truck or cart on which imaging system 308 and orientation unit 310 are mounted. In other examples, transport system 302 may take the form of a robotic unit that is controlled by data processing unit 304. In the example of obtaining data to create a three-dimensional model of an area between a liner and a shell of a fuselage, transport system 302 may be a vehicle that is driven directly into object 312.

Response 318 also may include information used by orientation unit 310 to determine the orientation of imaging system 308 during the scanning process. Response 318 may be stored within transport system 302 for later transmission to data processing unit 304. In other examples, transport system 302 may transmit response 318 to data processing unit 304 during the scanning process.

Data processing unit 304 processes data to generate model 314. This model may be displayed on display 306 for a user or stored for later use, such as, for example, without limitation, planning modifications to the interior of the aircraft. In this manner, hidden objects or components within object 312 may be identified and the data gathered from the scans may be used to generate a three-dimensional model of these hidden objects or components.

The different advantageous embodiments provide a method, apparatus, and computer usable program code for generating three-dimensional data for an object. The method also may be a computer implemented method. A response is received from scanning an object. Image data is generated from this response. A two-dimensional image may be generated from the image data. An object of interest may be identified from the two-dimensional image. This data may then be used to find points and curves for creating a three-dimensional model. A first surface is formed from the image data. A second surface also is formed in which the second surface has an intersection with the first surface. The model is then generated using the intersection of the surfaces. This type of process may be performed for each object identified from scanning the object.

In some advantageous embodiments, a three-dimensional model of an aircraft or components in an aircraft may be generated. X-rays are transmitted from a set of transmission points into the aircraft. In response to these transmissions, backscatter x-ray data is received to form received data. The received data may be used to generate a two-dimensional image from which an object of interest may be identified. Points for an object of interest in the aircraft are created from the received data for the identified object of interest. These points are placed at a first distance from the transmission point to a second distance from the set of transmission points to form a second curve. A first surface is formed from the first curve and the second curve. A second surface is formed that intersects the first surface to form an intersection. Three-dimensional data is generated for the model of the object of interest in the aircraft from this intersection.

This type of process may be repeated for each object of interest identified, in these examples. The set of transmission points is a set of one or more transmission points. The second surface may be, for example, a surface that is defined by the operator of modeling system 300.

In some of the depicted examples, this surface is selected to be in the space or section located between the liner and shell of an aircraft. In other examples, the second surface is formed from the received data that is received from a different perspective from the data used to generate the points for the first surface. This different perspective may be obtained from transmitting or emitting x-rays from the same transmission point, but at different angles with respect to the transmission point. In other embodiments, this other perspective may be obtained from points generated from data received from a different transmission point from the data used to generate the first surface.

Turning now to FIG. 4, a diagram of a data processing system is depicted in accordance with an illustrative embodiment of the present invention. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation.

Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406, in these examples, may be, for example, a random access memory. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as, program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 and may be loaded onto or transferred to data processing system 400 for execution by processor unit 404. Program code 416 and computer readable media 418 form computer program product 420 in these examples. In one example, computer readable media 418 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive or a flash memory that is connected to data processing system 400.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown.

For example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

With reference now to FIG. 5, a diagram illustrating components within an imaging system and an orientation unit are depicted in accordance with an advantageous embodiment. Collimator 500 and detector unit 502 are part of an imaging system, such as imaging system 308 in FIG. 3. Image sensors 504 and 506 are components within an orientation unit, such as orientation unit 310 in FIG. 3.

In this example, collimator 500 is an example of a collimator in an imaging system, such as imaging system 308 in FIG. 3. Collimator 500 is a rotating component, in these examples. Collimator 500 may be rotated around axis 510 along the direction of arrow 512. Collimator 500 include opening or hole 514 through which x-rays 516 may be emitted. This opening or hole may be considered the transmission points for the x-rays. In other embodiments, the location of the x-ray source within collimator 500 may be considered the transmission point. In these examples, hole 514 is formed in a manner that x-rays 516 are emitted in a direction that is around or substantially perpendicular to surface 518 of collimator 500.

In other examples, multiple holes may be present within surface 518. These holes also may be formed such that the emissions of x-rays, such as x-rays 516, are offset from the emission of x-rays from other holes with respect to surface 518. In this manner, x-rays may be emitted in a manner that provides different perspectives with respect to detecting a response.

In other embodiments, collimator 500 may be rotated along two axes. A two axes rotation is performed from a signal transmission point to obtain a spherical scan, in these examples.

X-rays 516 are emitted from collimator 500 in a manner that penetrates object 526. X-ray photons may be scattered or reflected from components or other objects within object 526 to form backscatter x-ray data in the form of response 522.

Detector unit 502 contains one or more detectors that detect the scattering of x-rays emitted from collimator 500 in response 522. In this example, data collected from the scattering or reflection of x-rays may be found in objects or components hidden from view between shell 528 and liner 530 within object 526.

Image sensors 504 and 506 are mounted on collimator 500, in these examples, and are laterally spaced apart from each other at a distance as desired for a particular implementation. By mounting image sensors 504 and 506 a known distance apart from each other, the orientation unit is allowed to determine the orientation of the imaging system relative to an object or structure, such as object 526, in these examples.

Reference points 532 may be attached to object 526 as references or points used to obtain orientation information for collimator 500.

In these examples, image sensors 504 and 506 may be, for example, without limitation, a white light scanner or laser scanner. The field of view of these sensors are suitably large enough to include at least three reference points, within reference points 532, to provide information for creating three-dimensional data. Detection of this information also forms a part of the response, such as response 318 in FIG. 3. With this information, a three-dimensional relationship between the imaging system and the object may be identified through principals of triangulation and photogrammetry and videogrammetry.

The orientation of collimator 500 may be identified through an encoder on the rotating axis or axes of collimator 500. In this manner, knowing the position of collimator 500 and having reference points through the use of reference points 532 allow for an identification of a three-dimensional relationship between the imaging system and object 526.

Object 526 may take various forms. For example, object 526 may be a portion of a fuselage of an aircraft. In this example, shell 528 is a fuselage skin in which liner 530 is located in the exterior of object 526. Further, other devices and systems may be located between liner 530 and shell 528. X-rays 516 may be scatter off devices or systems located between shell 528 and liner 530. This reflection or "backscattering" of x-rays 516 is detected by detection unit 502, in these examples. As depicted, when rotating along a single axis, collimator 500 may be moved along a direction as indicated by arrow 533.

The different advantageous embodiments may produce additional data from images based on the different projection schemes used to transmit the x-ray data described above. For example, images may be made by using x-ray beams that are always parallel to each other. This type of implementation produces an image that is equivalent to an orthographic projection in a standard two-dimensional drawing.

In another implementation, the imaging system may traverse a curve surface while emitting x-ray beams that are always normal to the surface. This type of scan produces an image that is equivalent to a flat pattern drawing used in the creation of sheet metal parts. In yet another advantageous embodiment, the imaging system may be stationery, in which the x-ray beam is emitted from a common center such that the beam rotates in a vertical and horizontal axes. This type of implementation produces image data that is spherical in nature. The response received from these scans may be stored and presented in different formats.

In these examples, the image may be stored in a manner such that vertical and horizontal positions are mapped to equally spaced and parallel lines equivalent to latitude and longitude on a map. This type of mapping may be made using standard photographic processing tools for spherical images to extract spherical, plainer, and cylindrical panoramic data for further processing.

Additionally, in some embodiments, the processing allows for rotational movement around an axis that can be parallel to the direction of travel or offset from the direction of travel by fixed amount in which liner translation occurs along the direction of travel. This type of embodiment produces images that have a latitude structure similar to spherical images. This type of scan provides data that is linearly accurate for each scan line in the vertical direction. All of these different types of data and images may be processed to create three-dimensional data for use in creating models of different objects.

Figure 6:
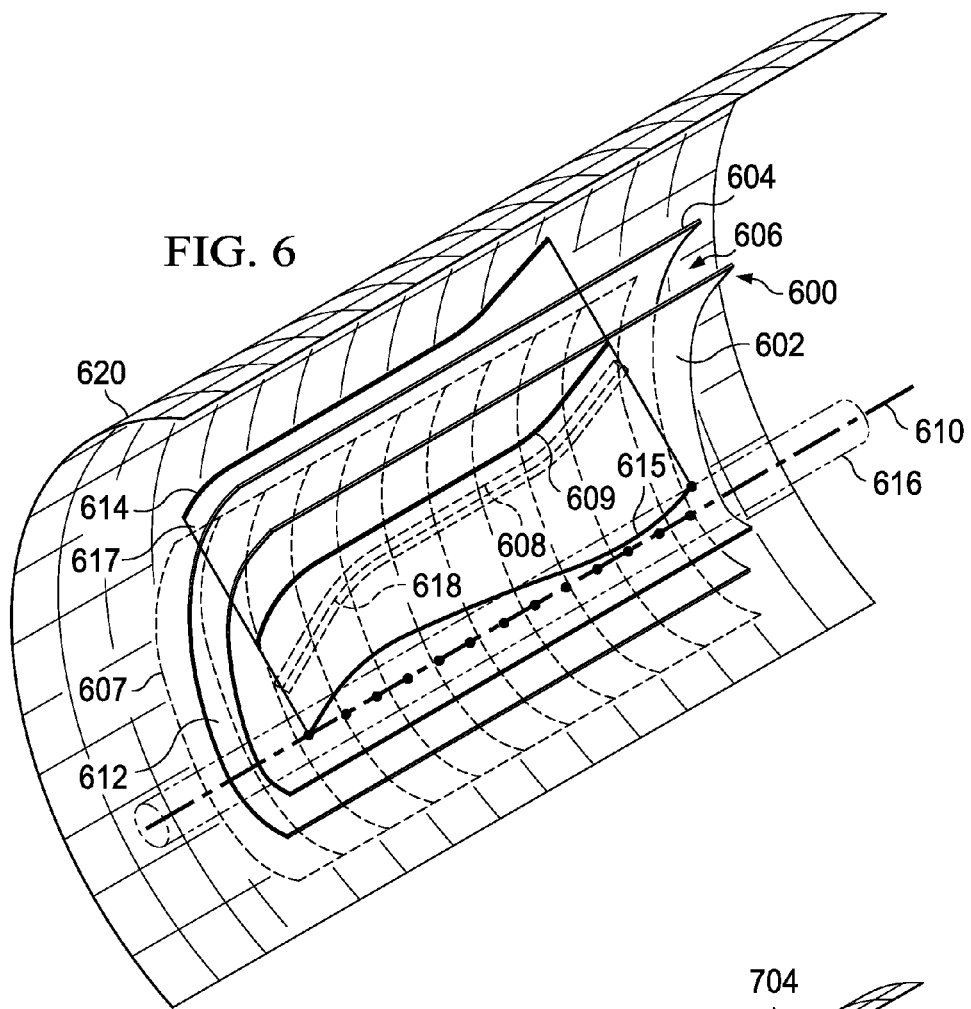
FIG. 6 is a diagram illustrating the creation of approximate three-dimensional geometric data in accordance with an advantageous embodiment.

With reference now to FIG. 6, a diagram illustrating the creation of approximate three-dimensional geometric data is depicted in accordance with an advantageous embodiment. In this example, data is obtained for an object of interest within an object through scanning the object with an x-ray beam. This particular example sends an x-ray beam into the object using a cylindrical scan along an axis. In other words, at each point in the travel of the transmitter, a circular sweep of the object is made.

In this example, an imaging system, such as imaging system 308 in FIG. 3, may be used to generate data through a single pass of an object. In this example, a partial cross-section perspective view is depicted for structure 600. In this example, structure 600 is an object that takes the form of a fuselage, which has inner liner 602 and shell 604. Section 606 represents a space between shell 604 and inner liner 602. In this example, tube 608 is an example of an object of interest present in section 606 within structure 600.

In these examples, axis 610 represents an axis along which an imaging system containing a collimator, such as collimator 500 in FIG. 5, moves to project x-ray beams. The different points along axis 610 represent a set of transmission points. This set of transmission points may be one or more points, depending on the particular implementation.

The backscatter data detected from the x-rays emitted through section 612 may be detected as backscatter x-ray data, in these examples. An image may be generated from the backscattered data for analysis. The analysis may identify or extract the presence of a set of objects of interest. The data in the image for the identified objects may be used to define primitives to create a three-dimensional model. An example of the projection backscatter x-ray data onto a surface may be seen in FIG. 10.

The different advantageous embodiments generate approximate three-dimensional geometric data for use in a model, such as a computer aided design model by selecting a surface located between or as the midpoint within section 607.

Further, backscatter data may be mapped or translated into points at different distances from axis 610. The first distance is selected to be closer than inner liner 602 as represented by surface 616. The other distance for mapping points is selected to be a distance that is greater than shell 604 as represented by surface 620. In each mapping of data, points are identified for tube 608. These different points may be translated or turned into a primitive representing a curve for tube 608. The two curves, curves 614 and 615, at the two different distances may then be used to form second surface 617. Curve 615 is on surface 616. This second surface 617 intersects surface 607 within section 606 to form curve 609 on surface 607. Curve 609 is used to create a three dimensional representation of tube 608. The three dimensional representation is not an exact representation of tube 608, but it is close enough to do design surveys and plan equipment placement strategies.

The intersection of these two surfaces may be used to map or fix tube 608 to a three-dimensional location. In this manner, identifiable objects, such as tube 608, may be identified and three-dimensional data may be generated for a three-dimensional model of tube 308 in FIG. 3. A curve may be created on top of the object of interest identified by the scans. The curve may be, for example, a wire, hydraulic tube, a box, or a frame. This curve may be created as close as possible to the center line of the image of an object, such as a wire or a tube. With other objects, the curve may be combined with other curves to outline the shape of the object.

Figure 7:
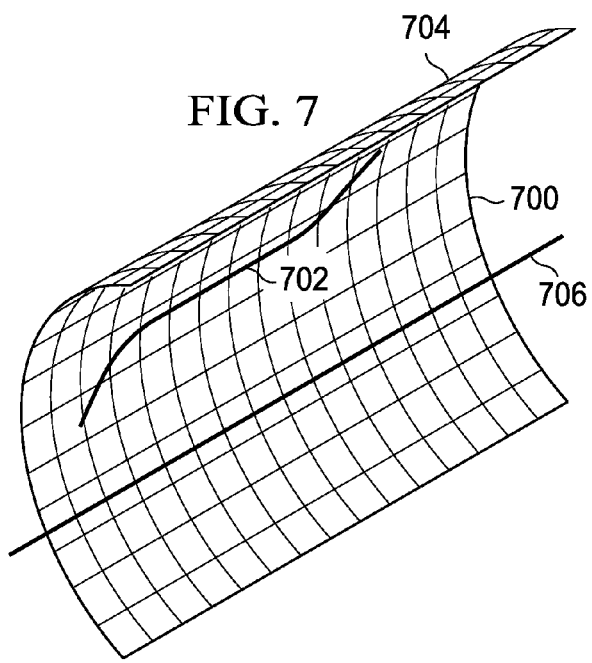
FIG. 7 is a diagram illustrating a result in a three-dimensional image in accordance with an advantageous embodiment.

Turning now to FIG. 7, a diagram illustrating a result in a three-dimensional image is depicted in accordance with an advantageous embodiment. In this example, model 700 provides a three-dimensional representation of tube 608, within structure 600 in FIG. 6, as curve 702. In this example, curve 702 is generated on surface 704 as a projection of backscatter x-ray data collected from an x-ray source moving along center line 706. Surface 704 is a surface selected from a computer aided design model as the appropriate location of the three dimensional data. Curve 702 is selected by the user from image data.

In these examples, the location of points in the image created from the x-ray data may be projected directly onto surface 704 to create curve 702 in a manner that this curve lays on surface 704. In these examples, the projection in model 700 takes into account the position of the x-ray beam and the shape of the path as each point is projected onto surface 704.

In this manner, a need to create two space curves in surfaces and intersecting the curves on a third surface is unnecessary. This type of data provides an approximation of the objects within a three-dimensional space. In many cases, users are interested in the presence and approximate positions of an object and do not need an exact size and position of the object.

This type of implementation may be useful to identify objects between a shell and liner in the fuselage of an aircraft. This type of embodiment produces an approximation of objects within an aircraft fuselage. This type of scan is useful when reverse engineering of the object is not possible or feasible until later in the modification process. When modifying an aircraft, the presence and approximate location of an object between a liner and a shell is more important than the exact size of the object.

When a more exact representation of objects and a three-dimensional space is needed, an off angled dual beam scan and a two point spherical scan may be employed. With these types of scans, surfaces are created from the responses to scan an object with x-ray beams. The surfaces are made of rays that emanate from the x-ray device at a given moment and pass through pixels that represent the object in the x-ray image. A surface is created for each of the pairs of images. The intersection of these surfaces provides a more accurate representation of the represented surface node because both surfaces were created from a surface that was defined by the object. The represented surface, in the embodiment described above, use one surface in the object and another surface that is created as an arbitrary reference. This type of embodiment is useful in identifying the location of the objects of interest and occupies a more cubic type volume as opposed to a surface type volume. This type of implementation may be used for obtaining three-dimensional data about the structure around a wing mount.

Figure 8:
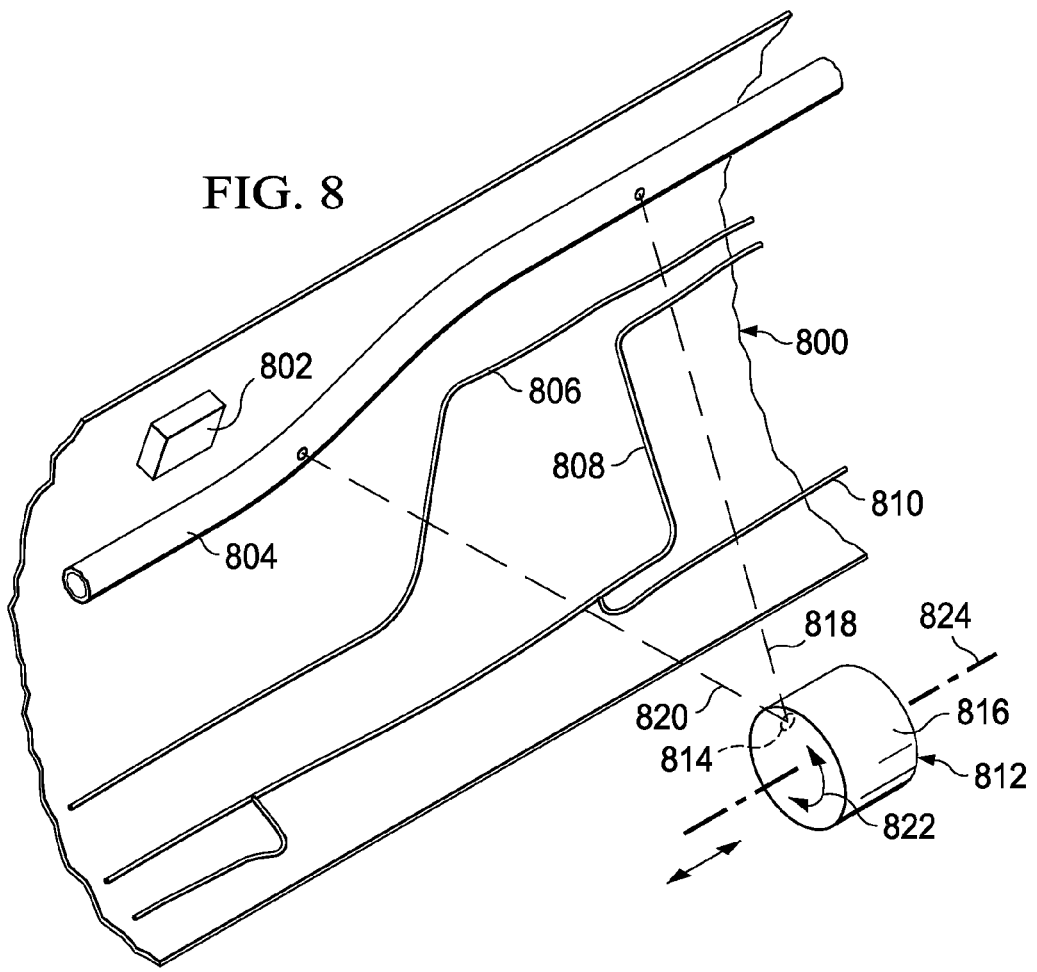
FIG. 8 is a diagram illustrating a cylindrical scan from offset beams in accordance with an advantageous embodiment.

Turning now to FIG. 8, a diagram illustrating a cylindrical scan from offset beams is depicted in accordance with an advantageous embodiment. In this embodiment, an off angled dual beam scan is used in which the beams of the x-ray device are offset from each other such that triangulation techniques may be used to determine the location of the objects. In this example, two images are produced with a cylindrical projection. In this example, structure 800 is an object that is part of a fuselage of an aircraft in which other objects are present. In these examples, the other object includes, for example, box 802, tube 804, wire 806, wire 808, and wire 810.

In this example, collimator 812 includes holes 814, which are formed within surface 816, of collimator 812, to emit beam 818 and beam 820 as collimator 812 rotates along the direction of arrow 822 and moves along axis 824. Beam 818 is offset from beam 820 in these examples. In this manner, a single scan of structure 800 generates two sets of data.

As a result, one set of data is generated for each beam. Each set of data is from a different perspective. Those two sets of data may be used to locate the position of box 802, tube 804, wire 806, wire 808 and wire 810 within structure 800 in a three-dimensional space. With this three-dimensional data for different points for the objects, a three-dimensional model of structure 800 may be made.

Figure 9:
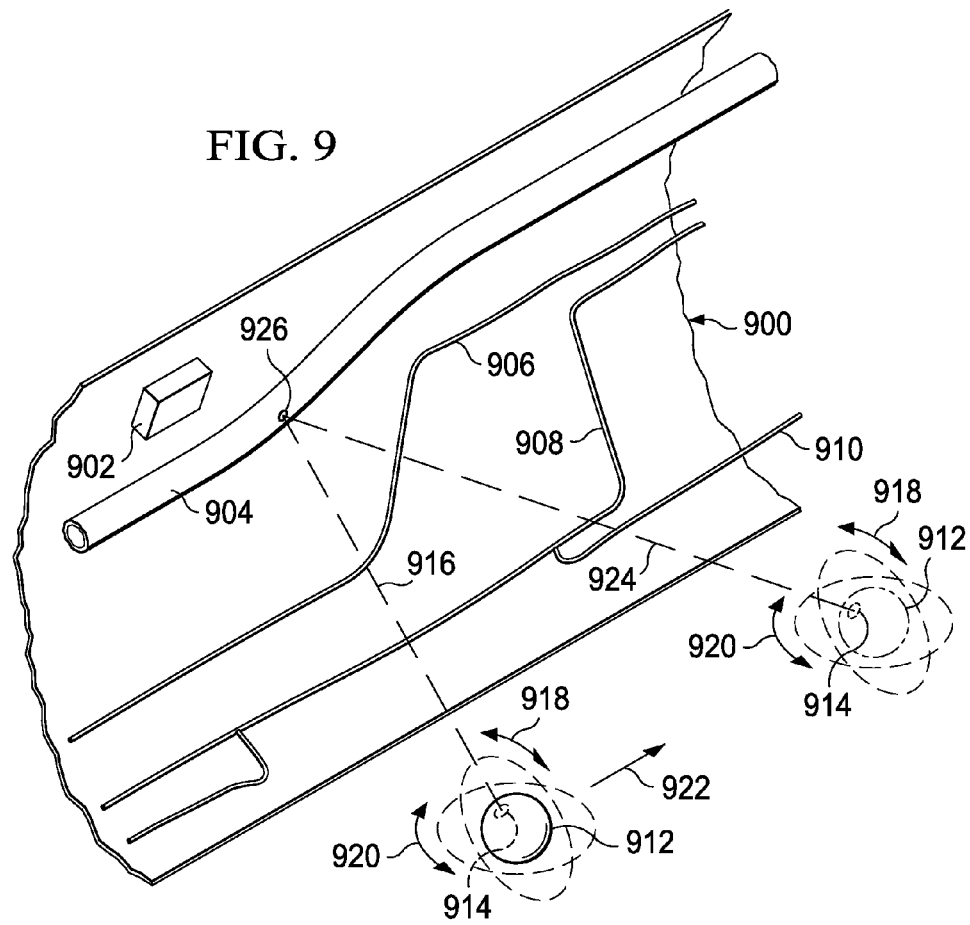
FIG. 9 is a diagram illustrating a two point spherical scan in accordance with an advantageous embodiment.

Turning now to FIG. 9, a diagram illustrating a two point spherical scan is depicted in accordance with an advantageous embodiment. In this implementation, a spherical scan is generated from two different positions such that the object is encompassed by both of these scans. These two points provide two sets of data used to identify a location of objects.

In this example, structure 900 is an object that contains box 902, tube 904, wire 906, wire 908 and wire 910. In this particular example, collimator 912 has hole 914 that transmits beam 916 when scanning structure 900. Collimator 912 may rotate around two axes as indicated by curves 918 and 920. In this manner, a spherical scan from a single point is obtained from structure 900.

Collimator 912 may then be moved to a second point along the direction of arrow 922. At the second point, another spherical scan of structure 900 may be performed. At this new position, collimator 912 emits beams 924 to perform a spherical scan. In this manner, every location within structure 900 contains data from two points. For example, point 926 has backscatter x-ray data that is collected from the transmission of beam 916 in the first location and beam 924 in the second location. These two scans provide two sets of image data that may be used to locate the position of objects of interest, such as box 902, tube 904, wire 906, wire 908, and wire 910, within structure 900. In other words, each point, such as point 926, has two pieces of data. This data is used to identify the location of point 926. The other data used to triangulate or locate point 926, in a three-dimensional space, is the locations of collimator 912.

Figure 10:
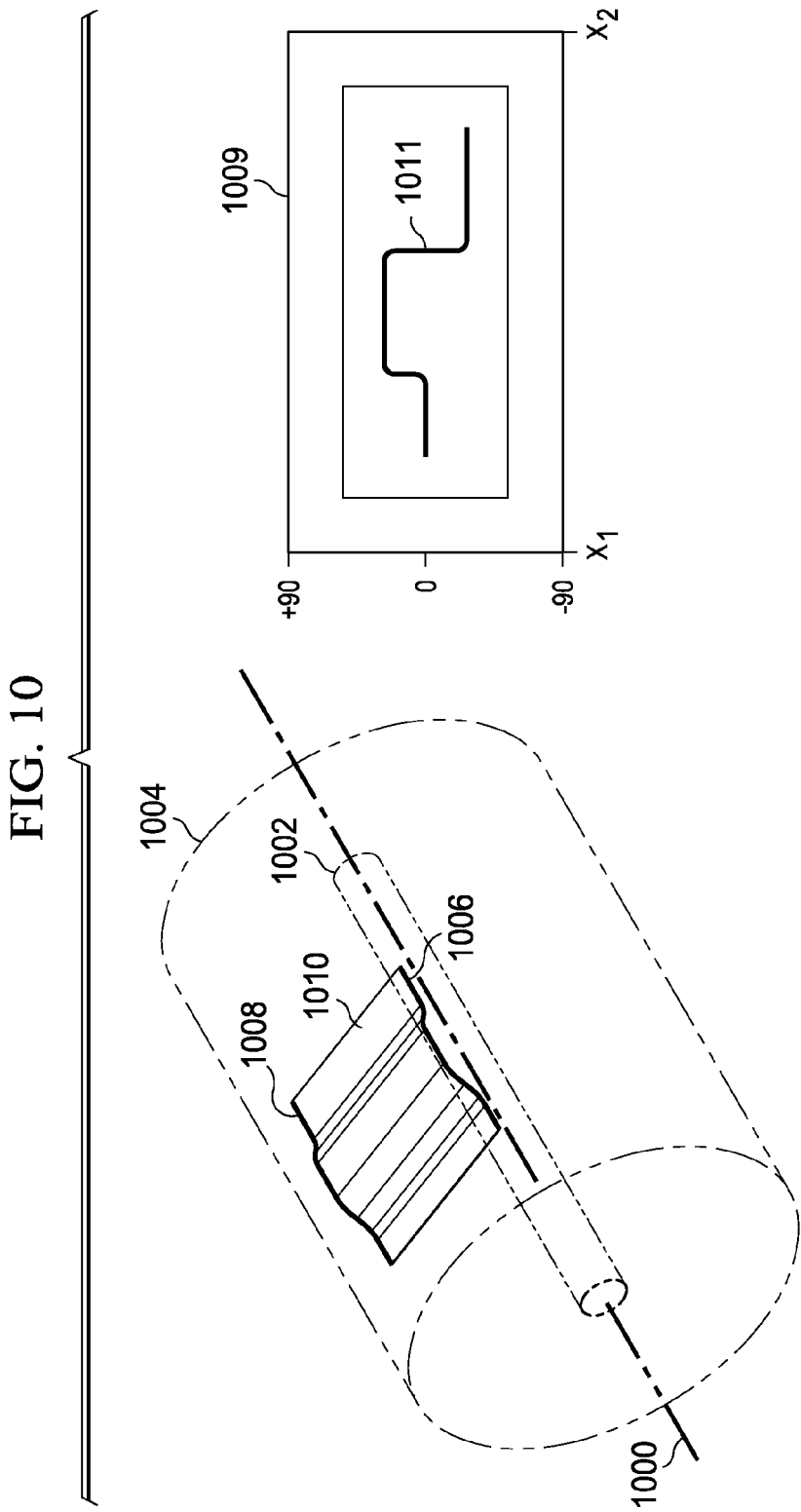
FIG. 10 is a diagram illustrating the projection of data in accordance with an advantageous embodiment.

With reference next to FIG. 10, a diagram illustrating projection of data is depicted in accordance with an advantageous embodiment. In this example, x-ray beams may be projected or transmitted using collimator 812 in FIG. 8. In this example, the data received in a response for each of the beams may be projected at different distances from the transmission points, which take the form of holes 814 in FIG. 8, in these examples. In other embodiments, the transmission point may be from the source located within collimator 812 in FIG. 8.

In this example, axis 1000 is an axis along which transmission points are present from the emission of beams from holes in a collimator. In this example, two distances are selected from axis 1000. Projection 1009 illustrates a two-dimensional diagram of data including an object of interest, curve 1011, from which data for a set of primitives, such as curves 1006 and 1008, for the object of interest may be derived. These two distances form cylinders 1002 and 1004. In this example, curve 1006 is mapped onto an image on cylinder 1002. Curve 1008 is mapped onto cylinder 1004.

Both of these curves represent an object of interest in the response gathered from scanning the object. In these examples, the distance for each mapping of data from the response may be selected as any distance. Typically, the first distance is selected to be closer to the transmission point than the surface of the object. The second distance for the second cylinder may be selected as a distance that results in a cylinder that encompasses the object of interest.

Curve 1006 and curve 1008 may then be used to form surface 1010. Surface 1010 forms a surface for the scan performed by one of the beams illustrated in FIG. 8. A similar process may be performed for the other beam to generate a second surface.

Figure 11:
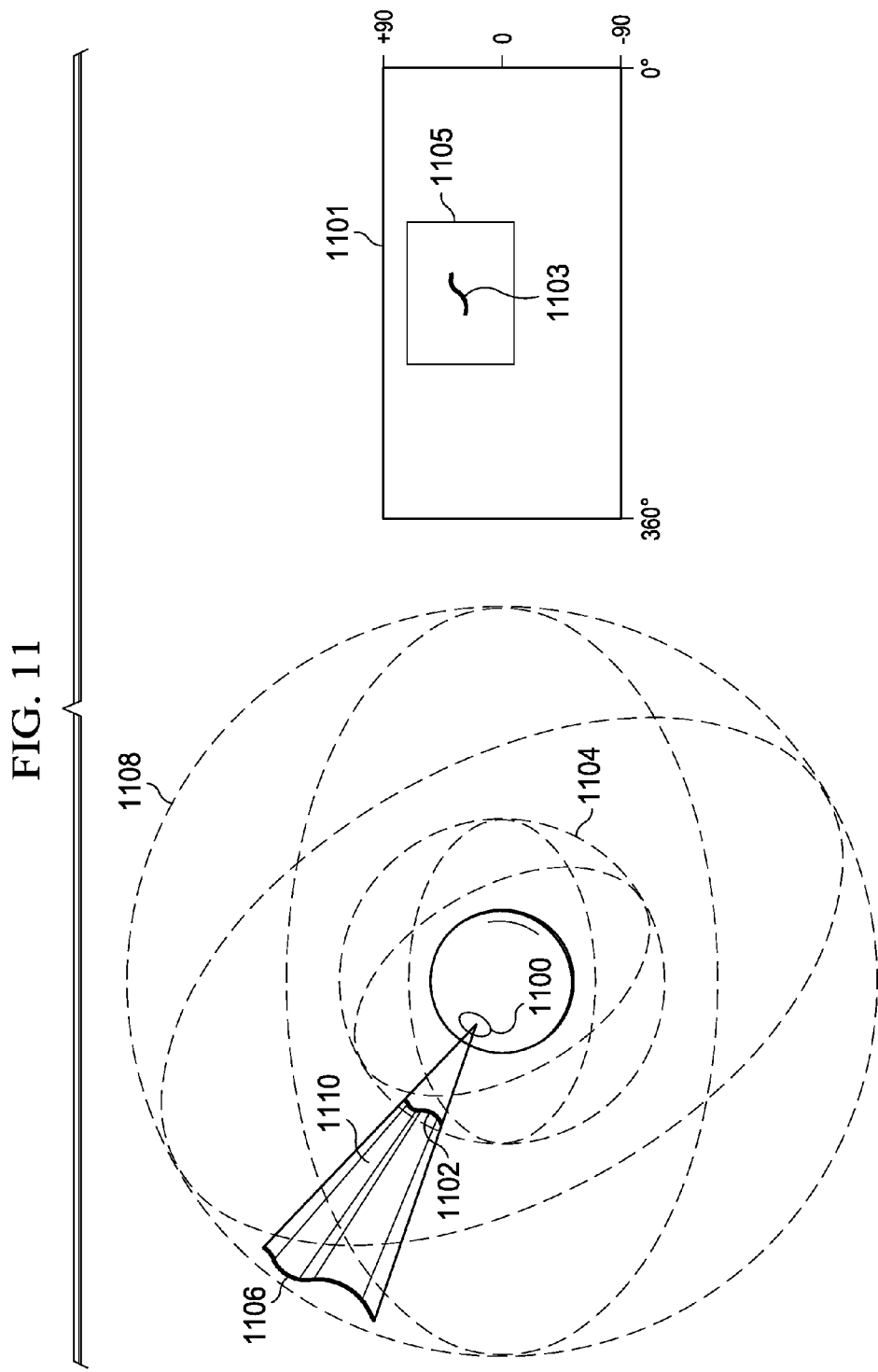
FIG. 11 is a diagram illustrating the projection of data from a spherical scan in accordance with an advantageous embodiment.

With reference now to FIG. 11, a diagram illustrating the projection of data from a spherical scan is depicted in accordance with an advantageous embodiment. In this example, point 1100 represents a transmission point from which a beam is transmitted from a collimator in a spherical pattern. In these examples, the data may identify an object of interest, such as a tube. Projection 1101 is a two-dimensional diagram of data including an object of interest, 1103, form which data for curves 1102 and 1106 may be derived. In this example, the image data in section 1105 within projection 1101 is a segment of an equal rectangular image that can be mapped on to full spherical equal rectangular image. In this example, the same data from point 1100 is mapped or projected onto to spheres of different sizes.

Curve 1102 is projected onto sphere 1104, while curve 1106 is projected onto sphere 1108. These spheres are selected such that the actual location of the object of interest represented by curve 1102 and curve 1106 is between the two spheres. The size of the spheres may be depicted as any size. Curve 1106 and curve 1102 may be used to form surface 1110. This type of analysis and processing of data is performed for each location for each object of interest. As a result, two surfaces are generated for each object of interest, in these examples.

Figure 12:
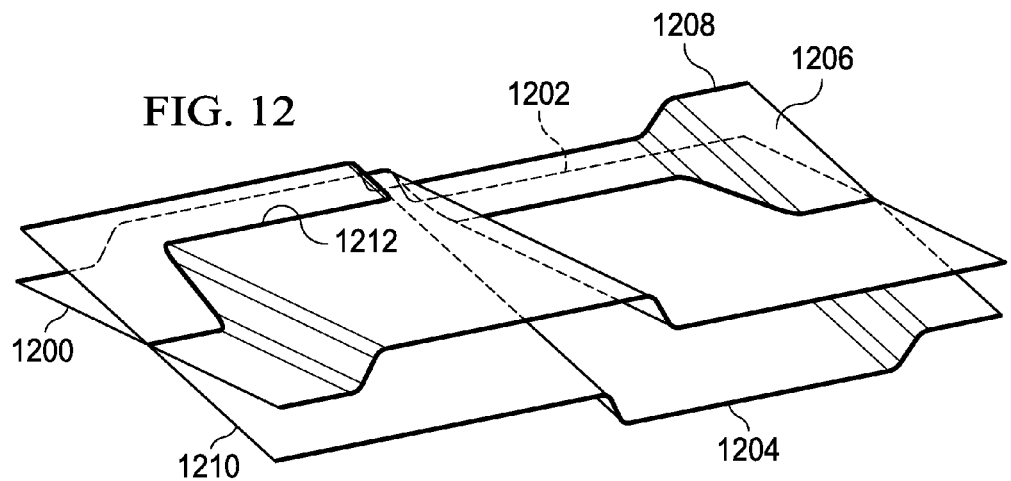
FIG. 12 is a diagram illustrating an intersection of surfaces in accordance with an advantageous embodiment.

With reference now to FIG. 12, a diagram illustrating an intersection of surfaces is depicted in accordance with an advantageous embodiment. In this example, surface 1200 is formed from curve 1202 and 1204. This surface may be formed from data gathered from backscattering of a perpendicular x-ray beam, in these examples. Surface 1206 is formed using curves 1208 and 1210. Surface 1206 is an example of a surface generated from data collected by a beam offset from the other beam illustrated in FIG. 8.

Curve 1212 represents an intersection of surfaces 1200 and 1206. This intersection provides a three-dimensional position for curve 1212 for the three-dimensional data used to create a model of the object. This type of process may be performed for each object of interest.

Of course, although the different examples illustrate a curve, other shapes and configurations of objects may be identified. With the identification of curve 1212, a model or primitives used to generate a wire frame model of a tube may be used, with the location of curve 1212, to generate a three-dimensional model of this object of interest. This process may be performed for each object of interest in a structure.

Figure 13:
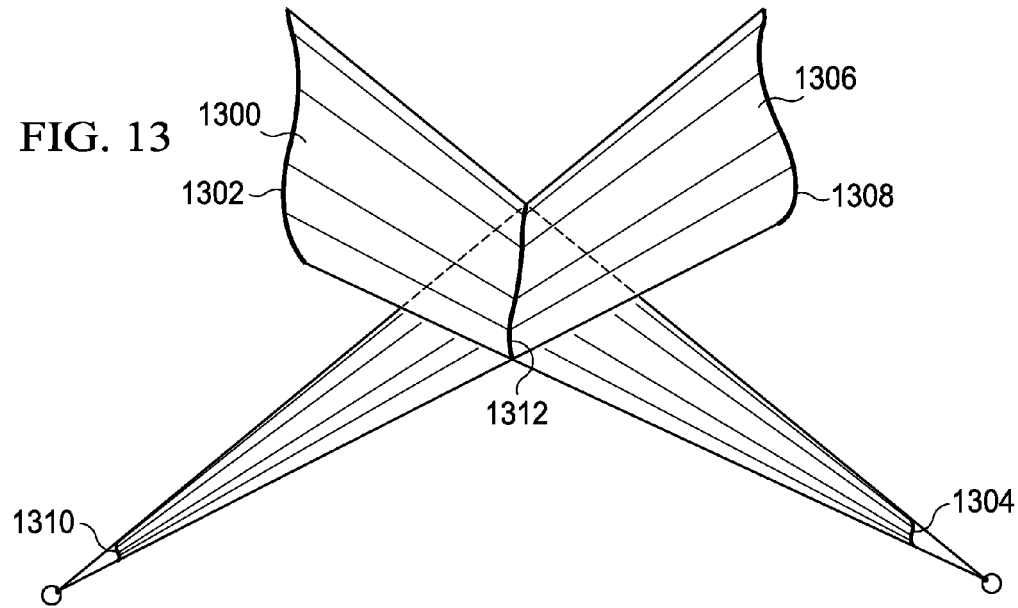
FIG. 13 is a diagram illustrating identifying a location for an object of interest using spherical scans in accordance with an advantageous embodiment.

With reference now to FIG. 13, a diagram illustrating identifying a location for an object of interest using spherical scans is depicted in accordance with an advantageous embodiment. In this example, surface 1300 is formed from curve 1302 and curve 1304. Surface 1306 is formed from curve 1308 and curve 1310. The intersection of these two surfaces results in curve 1312, which provides a location for the curve representing the object of interest, in these examples.

Turning now to FIG. 14, a diagram illustrating components used to generate and process three-dimensional computer aided design data from beams used to scan an object is depicted in accordance with an advantageous embodiment. In these examples, the different software components and data structures illustrated may be implemented in a data processing system, such as data processing unit 304 in FIG. 3.

In these illustrative example, three-dimensional data generation application 1400 receives response 1402. Three-dimensional data generation application 1400 generates three-dimensional data 1404 from response 1402. In these examples, three-dimensional data generation application 1400 may be located on a data processing system, such as data processing unit 304 in FIG. 3.

In the different advantageous embodiments, three-dimensional data generation application 1400 generates three-dimensional data 1404 through mapping points identified from the scans for an object of interest at two different distances from the transmission point. These points are used to generate a surface. Another surface is then selected or generated that intersects with this first surface. The intersection forms the location of three-dimensional data for the object of interest. This type of process may be performed by three-dimensional data generation application 1400 for all objects of interest identified in the scan.

Three-dimensional data 1404 is sent to computer aided design application 1406. Computer aided design application 1406 takes three-dimensional data 1404 and generates model 1408. In generating model 1408, the different curves may represent different objects of interest or combine to form an object of interest by computer aided design application 1406. With an identified object of interest position in three dimensions, parts may be obtained from library 1410 to replace these curves to represent the object of interest in model 1408.

With reference now to FIG. 15, a flowchart of a process for generating a three-dimensional model is depicted in accordance with an advantageous embodiment. The process illustrated in FIG. 15 may be implemented using a system, such as modeling system 300 in FIG. 3.

The process begins by receiving a response from scanning an object (operation 1500). This response may be, for example, a scan made by moving an imaging system along an axis to obtain a response. In other embodiments, this operation may involve performing a spherical scan at one location and performing another spherical scan at a second location.

Next, image data is generated from the response (operation 1502). Operation 1502 may include creating points for the data received in the response. This data may be mapped as a two-dimensional drawing using coordinate information received from the orientation unit.

In other words, operation 1502 includes taking the received data from the scan and creating a two-dimensional image. The image may be presented on a screen and an object of interest may be selected from the image. For example, a line on the image may represent a pipe or tube and may be selected for further processing. The selected object may be defined mathematically, in these examples. For example, this particular object may be defined at a series of points or a plurality of points in connecting curves. These points and/or curves are also referred to as primitives. This two-dimensional representation of the object is used for the projections described below.

A first surface is formed from the image data (operation 1504). This first surface may be generated through the identification of a set of objects of interest, as described above. Each object of interest is mapped or projected from a selected distance from the transmission point. For example, if the object of interest is a tube that has a curve, the curve representing the tube may be projected at a first distance from the transmission point and a second distance from the transmission point. These two distances are selected such that the actual location of the object is between the first and second distances, in these examples. These two lines may then be used to generate the first surface.

Thereafter, a second surface is formed that has an intersection with the first surface (operation 1506). The intersection provides three-dimensional data for a curve representing the object of interest. This second surface may be an arbitrary or selected surface that is created by a user. In this type of embodiment, the surface is usually selected to be in a space or area in which the object is located. As a specific example, the surface may be the center of a space located between a liner and a shell of an aircraft, in which the object of interest is present. In this manner, the second surface is an approximation of the surface on which the object of interest is located. This type of implementation provided approximate data for a three-dimensional model of the object.

In other advantageous embodiments, the second surface may be formed in the same manner as the first surface using a second set of data from a different perspective. This perspective now has positioning information in a three-dimensional space.

The process generates the model using the intersection (operation 1508), with the process terminating thereafter. In generating the model, this line or set of primitives from the intersection may then be replaced with a model representing the object of interest. For example, if the curve is a tube, then the model for a tube may be used in the location of the line. In this manner, the model of the object of interest may be generated with a position in a three-dimensional space.

In FIG. 16, a flowchart of a process for generating a three dimensional model is depicted in accordance with an advantageous embodiment. The process illustrated in FIG. 16 may be implemented using a system, such as modeling system 300 in FIG. 3.

The process begins by receiving a response from scanning an object (operation 1500). Thereafter, image data is generated from the response (operation 1502). In these examples, the image data may be two dimensional image data that can be mapped as a two dimensional drawing using coordinate information from the orientation unit.

Additionally, the process selects a surface (operation 1504). This surface is a surface on which the object is to be projected. The process then selects an object from the image data (operation 1506). Operation 1506 may be performed using various recognition processes in artificial intelligence applications. Alternatively, a human operator may select objects from the image data.

The image data is then projected onto the surface (operation 1508). This type of implementation eliminates a need to create two space curves and surfaces and making a curve on the third support surface. Of course, any of the projection methods described in this disclosure may be used. A particular projection method for creating a three dimensional model from backscatter x-ray data may be selected based on the particular implementation.

Figure 17:
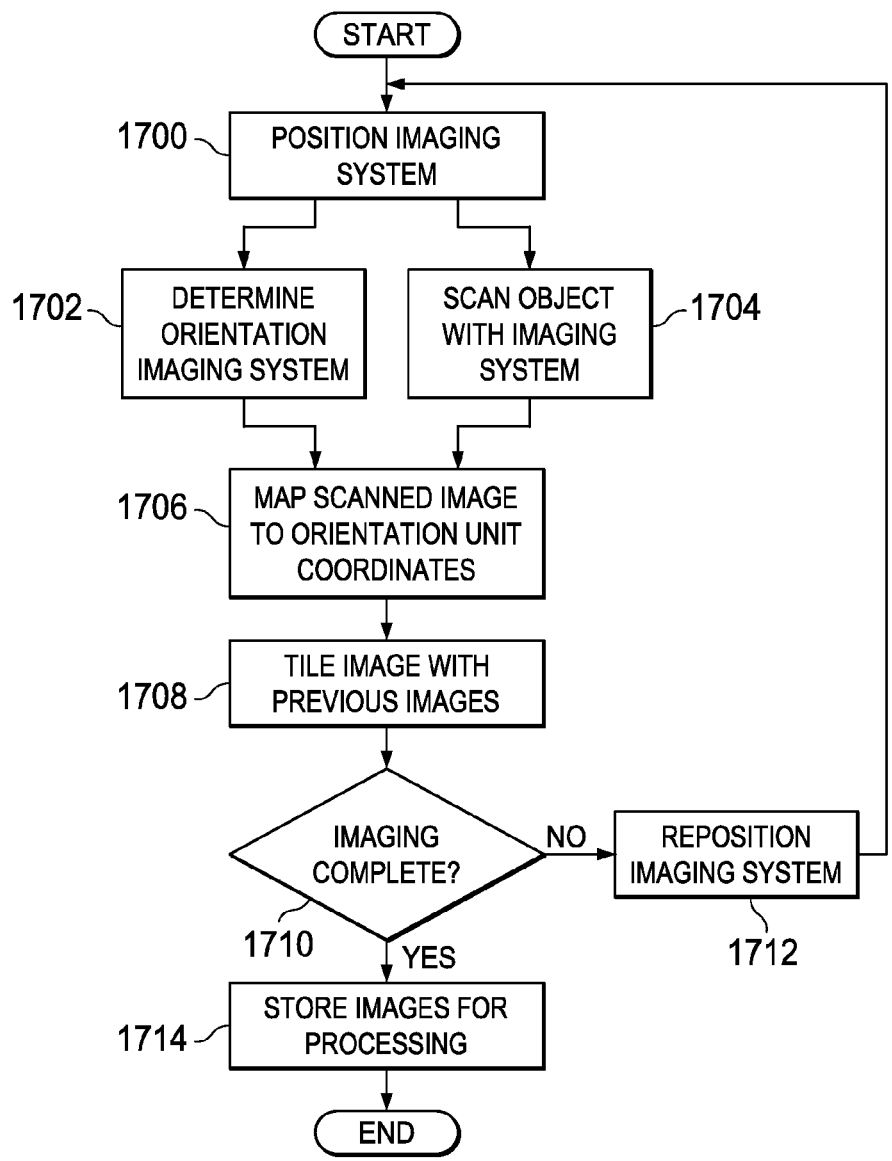
FIG. 17 is a flowchart of a process for scanning an object in accordance with an advantageous embodiment.

With reference now to FIG. 17, a flowchart of a process for scanning an object is depicted in accordance with an advantageous embodiment. The process illustrated in FIG. 17 may be implemented using a modeling system, such as modeling system 300 in FIG. 3. In particular, the different steps illustrated in this figure may be implemented using components, such as imaging system 308, orientation unit 310, and transport system 302 in FIG. 3 to transmit signals and detect responses. Data processing unit 304 in modeling system 300 in FIG. 3 may be used to control the transport system and initially process the data.

The process begins by positioning the imaging system (operation 1700). Operation 1700 may be performed by moving the transport system to the appropriate location with respect to the object that is being scanned, such as a fuselage of an aircraft. This operation may be performed manually or through the control of a data processing unit.

Next, the orientation of the imaging system is determined (operation 1702), and the object is scanned with the imaging system (operation 1704). In operation 1702, the orientation of the imaging system may be identified using an orientation unit cooperating with a data processing unit in which triangulation software and/or photogrammetry software are executing. During operation 1702, reference points within the field of view of sensors may be imaged and the location of these reference points on the object may be evaluated and identified to identify the orientation of the imaging system. In operation 1704, the imaging system emits one or more beams of x-rays to send signals into the object. Additionally, the response from these beams is detected in operation 1704.

Thereafter, the scanned image is mapped to coordinates generated by the orientation unit to create an initial or mapped image (operation 1706). By combining the position orientation information collected by the orientation unit at the time each image pixel is collected by the imaging system, an image may be assembled by mapping these signals to the appropriate coordinate that is identified. In this example, the image generated may be imported into a computer aided design tool, such as Catia. Catia V5R17 is a product of Dassault Systems. As part of operation 1706, in this example, the image is provided a specific location and scale such that points on the image plane may be mapped locations in the computer aided design part axis. For example, the image may be 0.1 times the number of degrees they represented in the image. If the image is 120 degrees vertically, then the computer aided design surface to which the image is mapped is 12 inches in height. The horizontal size may be represented by a similar factor of horizontal pixels per inches of travel. Of course, other mapping schemes or coordinate systems may be used, depending on the implementation.

Then, the image is tiled with previous images (operation 1708). This tiling comprises combining the image from this scan with other images previous taken to form a complete image. In these examples, the image taken in operation 1706 may be a single line or a single set of pixels used to form a complete image of the object with other pixels.

A determination is made as to whether the imaging has been completed (operation 1710). If the imaging has not been completed, the process repositions the imaging system (operation 1712). The repositioning of the imaging system may include moving the transport system from one location to another location if the imaging uses two or more points. In other embodiments, the transport system may continuously move to reposition the imaging system until the imaging is completed. The process then returns to operation 1702 and operation 1704 as described above.

If in operation 1710, the imaging has been completed, the images are then stored for processing (operation 1714), with the process terminating thereafter. This storage may be on a storage device located in transport system 302 in FIG. 3. In other embodiments, this storage may be accomplished by transmitting the data to a data processing unit or other computer.

The process illustrated in FIG. 17 generates the image from which objects may be identified for further processing. The data gathered during the process in FIG. 17 may be used to generate two-dimensional images that may be analyzed to extract or identify the presence of the object of interest. This extracted data may be used to define points and curves that may be used to create three-dimensional geometries, as described below.

Turning now to FIG. 18, a flowchart of a process for generating three-dimensional data for an object of interest is depicted in accordance with an advantageous embodiment.

The process illustrated in FIG. 18 may be implemented in a software component, such as three-dimensional data generation application 1400 in FIG. 14.

The process begins by mapping points at a first distance from the transmission point (operation 1800). The process then maps the same points at a second distance from the transmission point (operation 1802). In these examples, the points are for an object of interest identified from two-dimensional images generated from data obtained through the scan. This object of interest may be, for example, a tube, a box, a wire, or some other device. The geometries of different objects may be presented through curves, which may be straight lines, in some cases.

The process then forms a first surface using the curves generated from mapping the points at the two different distances (operation 1804). A second surface is then selected (operation 1806). In some embodiments, the second surface is selected by a user or operator of the modeling system. In other embodiments, the second surface may be formed using points for the same object of interest from a different perspective in the same manner the first surface is created.

Thereafter, an intersection of the two surfaces is identified to form a new curve (operation 1808). The new curve is then stored (operation 1810), with the process terminating thereafter. This curve includes the position of the points in the intersection in a three-dimensional space. This curve forms the data from which a model of an object may be created. This process may be performed for each curve or object of interest. Further, in some cases, a portion of an object of interest may be processed with the different portions being combined to generate the actual object of interest.

Turning now to FIG. 19, a flowchart of a process for creating a three-dimensional model from three-dimensional data is depicted in accordance with an advantageous embodiment. The process illustrated in FIG. 19 may be implemented computer aided design application 1406 in FIG. 14.

The process begins by selecting a curve for an object of interest (operation 1900). In this example, this curve is the curve generated through the intersection of two surfaces for a particular object of interest. This curve represents three-dimensional data used to create a model of the object.

Next, the type of object is identified (operation 1902). This identification may be made by an operator or by software, depending on the particular implementation. That identification of the object may be, for example, a tube, a wire, a box, or a more specific identification of the type of device. A part is retrieved for the type of object (operation 1904). This part is retrieved from a library of parts in a three-dimensional computer aided design system. The part is then inserted using the curve (operation 1906), with the process terminating thereafter. In this manner, a wire frame representation or set of primitives may now be placed into the model in the appropriate location, dimensions, and sizing for the object of interest that was scanned. This process may be repeated or performed for each object of interest within another object or structure to create a model of the object of interest. These models of the objects of interest may then be used to create the three-dimensional model of the structure.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments provide a computer implemented method, apparatus, and computer usable program code for creating three-dimensional data. A response is received from scanning the object. Image data is generated from the response. This image data is two-dimensional image data from which an identification of an object may be made for further processing. Objects that are identified may be used to define points and curves to create a three-dimensional geometry.

In creating three dimensional geometry or three dimensional models, the different advantageous embodiments create these models through a limited number of passes of the object. In the different advantageous embodiments, one to two passes are sufficient create the three dimension model as opposed to conventional imaging systems in which numerous passes are made from different angles.

In the different advantageous embodiments, an object of interest is identified in the x-ray backscatter data. In the different examples, the object of interest may be identified from a two dimensional image of the backscatter x-ray data. The identified object is projected onto a three dimensional surface to form the three dimensional model.

The manner in which the projection is accomplished may be implemented in different ways in the different advantageous embodiments. In one example, the information is projected directly onto a desired surface. In other embodiments, a first surface is formed from the image data. A second surface is then formed that has an intersection with the first surface, wherein the intersection forms the data. The model is generated using the intersection.

With this three-dimensional data, three-dimensional models may be formed. The models may be used to plan and perform activities, such as, for example, maintenance, repairs, and upgrades of an object, such as an aircraft. These collection of data using the different embodiments provides an ability to model objects of interest within an object or structure in a manner that can be used to plan different activities that affect the object or structure.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the present disclosure has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the disclosure, the practical application, and to enable others of ordinary skill in the art to understand the invention for various embodiments with various modifications as are suited to the particular use contemplated.

What is claimed is:

1. A method for generating a three-dimensional model of an object of interest in an aircraft, the method comprising:
   responsive to transmitting a plurality of x-rays from a set of transmission points into the aircraft, receiving backscatter x-ray data to form received data;
   identifying the object of interest from a two-dimensional diagram of the backscatter data to form an identification;
   creating a plurality of points for the object of interest in the aircraft from the identification in the received data;
   placing the plurality of points at a first distance from the set of transmission points to form a first curve;
   placing the plurality of points at a second distance from the set of transmission points to form a second curve;
   forming a first surface from the first curve and the second curve;
   forming a second surface that intersects the first surface to form an intersection; and
   generating three-dimensional data for the three-dimensional model of the object of interest in the aircraft from the intersection.

2. The method of claim 1, wherein the step of forming the second surface comprises:
   selecting the second surface as an approximation of a surface on which the object of interest is located in the aircraft.

3. The method of claim 1, wherein the step of forming the second surface comprises:
   creating a second plurality of points from the received data for a different perspective from the plurality of points;
   placing the second plurality of points at a first distance from the different perspective to form a third curve;
   placing the second plurality of points at a second distance from the different perspective to form a fourth curve; and
   forming the second surface that intersects the first surface to form the intersection.

4. The method of claim 3, wherein the plurality of points created from data received from transmitting x-rays from each transmission point in the set of transmission points at a first angle with respect the each transmission point and wherein the second plurality of points are created from other data received from transmitting the x-rays from the each transmission point in the set of transmission points at a second angle with respect to the each transmission point.

5. The method of claim 3, wherein the set of transmission points comprises two transmission points and wherein the plurality of points created from data received from transmitting x-rays from a first transmission point in the set of transmission points and wherein the second plurality of points are created from other data received from transmitting the x-rays from a second transmission point in the set of transmission points.

6. The method of claim 1, wherein the creating step comprises:
   mapping the received data to a plurality of coordinates to form the plurality of points.

7. The method of claim 1, wherein the object of interest is selected from one of a tube, a wire, and a box.

8. The method of claim 1 further comprising:
   transmitting the plurality of x-rays from the set of transmission points into the aircraft.

9. The method of claim 1 further comprising:
   generating the three-dimensional model of the aircraft using the three-dimensional data.

10. The method of claim 9 further comprising:
    modifying the aircraft using the three-dimensional model.

11. A computer implemented method for generating three-dimensional data for a three-dimensional model, the computer implemented method comprising:
    receiving a response from scanning an object;
    generating image data from the response;
    identifying an object of interest from the image data;
    forming a first surface from the image data;
    forming a second surface that has an intersection with the first surface, wherein the intersection forms the three-dimensional data of the object of interest; and
    generating the three-dimensional data for the three-dimensional model using the three-dimensional data.

12. The computer implemented method of claim 11, wherein the step of forming the first surface comprises:
    creating a set of primitives from the response;
    placing the set of primitives at a first distance from a set of transmission points to form a first curve;
    placing the set of primitives at a second distance from the set of transmission points to form a second curve; and forming the first surface from the first curve and the second curve.

13. The computer implemented method of claim 12, wherein the step of forming the second surface comprises: selecting the second surface as an approximation of a surface on which the object is located.

14. The computer implemented method of claim 12, wherein the step of forming the second surface comprises:
creating a second set of primitives from the response and a different perspective from the set of primitives;
placing the second set of primitives at the first distance from the different perspective to form a third curve;
placing the second set of primitives at the second distance from the different perspective to form a fourth curve; and
forming the second surface that intersects the first surface to form the intersection.

15. The computer implemented method of claim 11 further comprising:
sending x-ray beams into the object to generate the response.

16. The computer implemented method of claim 11, wherein the object is selected from one of a ship, an aircraft, a submarine, a spacecraft, a truck, a car, a power plant, and a dam.

17. An apparatus comprising:
an imaging system capable of transmitting signals into an object and receiving a response to the signals; and
a data processing unit capable of generating image data from the response; forming a first surface from the image data; forming a second surface that has an intersection with the first surface, wherein the intersection forms three-dimensional data; and generating a model using the three-dimensional data.

18. The apparatus of claim 17 further comprising:
a transport unit capable of moving the imaging system.

19. A non-transitory computer readable medium storing computer program code for generating three-dimensional data for a three-dimensional model, the computer program code comprising:
a computer readable medium;
program code stored on the computer readable medium for receiving a response from scanning an object;
program code stored on the computer readable medium for generating image data from the response;
program code stored on the computer readable medium for forming a first surface from the image data;
program code stored on the computer readable medium for forming a second surface that has an intersection with the first surface, wherein the intersection forms the three-dimensional data; and
program code stored on the computer readable medium for generating a model using the three-dimensional data.

20. The computer program product of claim 19, wherein the computer program code stored on the computer readable medium for forming the first surface from the image data comprises:
program code stored on the computer readable medium for creating a set of primitives from the response;
program code stored on the computer readable medium for placing the set of primitives at a first distance from a set of transmission points to form a first curve;
program code stored on the computer readable medium for placing the set of primitives at a second distance from the set of transmission points to form a second curve; and
program code stored on the computer readable medium for forming the first surface from the first curve and the second curve.

21. The computer program product of claim 20, wherein program code stored on the computer readable medium for forming the second surface that has the intersection with the first surface, wherein the intersection forms the three-dimensional data comprises:
program code stored on the computer readable medium for selecting the second surface as an approximation of a surface on which the object is located.

22. The computer program product of claim 20, wherein program code stored on the computer readable medium for forming the second surface that has the intersection with the first surface, wherein the intersection forms the three-dimensional data comprises:
program code stored on the computer readable medium for creating a second set of primitives from the response and a different perspective from the set of primitives;
program code stored on the computer readable medium for placing the second set of primitives at the first distance from the different perspective to form a third curve;
program code stored on the computer readable medium for placing the second set of primitives at the second distance from the different perspective to form a fourth curve; and
program code stored on the computer readable medium for forming the second surface that intersects the first surface to form the intersection.

23. The computer program product of claim 19 further comprising:
program code stored on the computer readable medium for sending x-ray beams into the object to generate the response.

24. The computer program product of claim 19, wherein the object is selected from one of a ship, an aircraft, a submarine, a spacecraft, a truck, a car, a power plant, and a dam.

* * * * *